May 29, 1923.
H. RICHARDSON
CAR UNLOADER
Filed Dec. 2, 1920
1,457,186
2 Sheets-Sheet 1
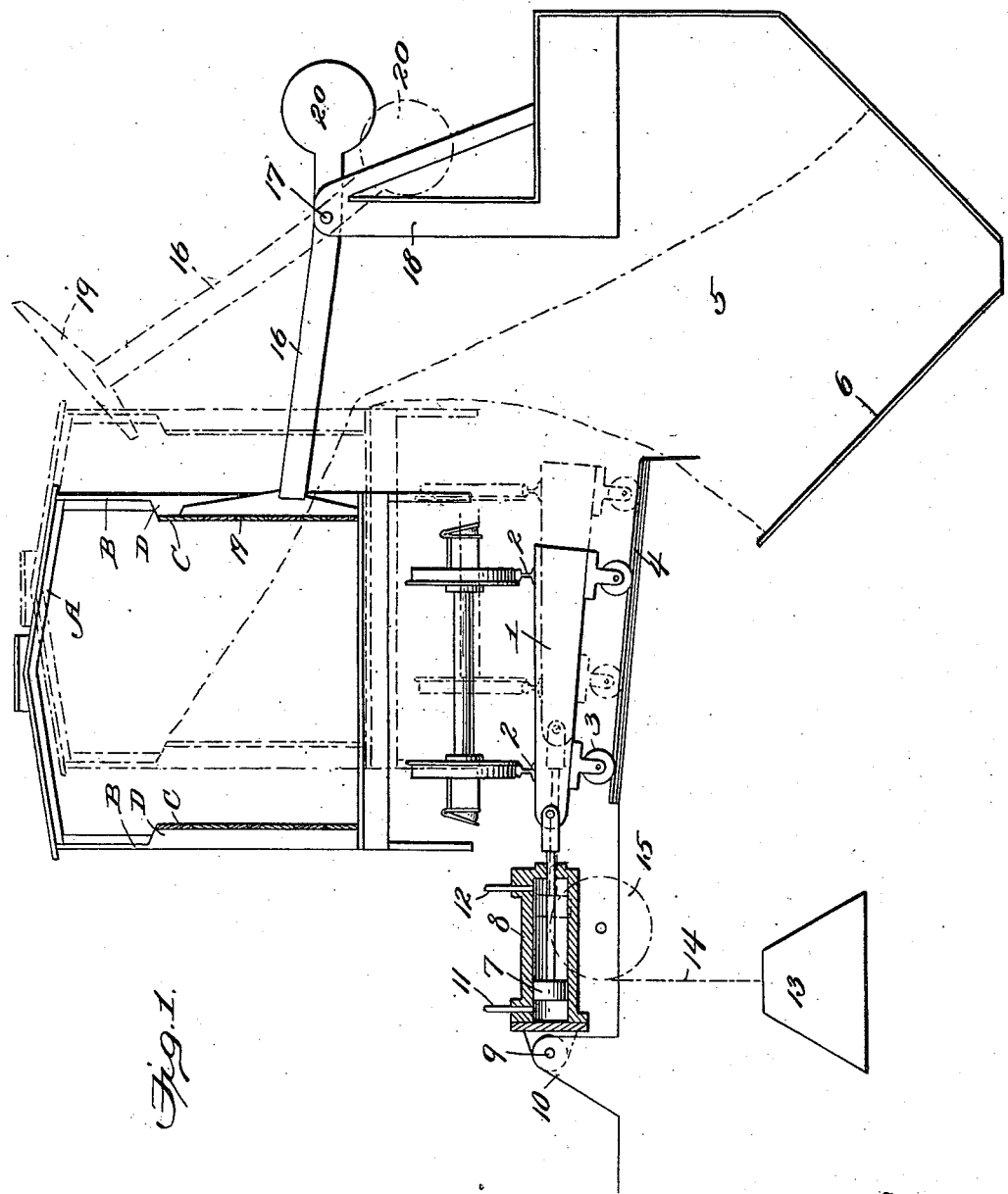
Inventor
Henry Richardson
By
Attorney May 29, 1923.
H. RICHARDSON
CAR UNLOADER
Filed Dec. 2, 1920
1,457,186
2 Sheets-Sheet 2
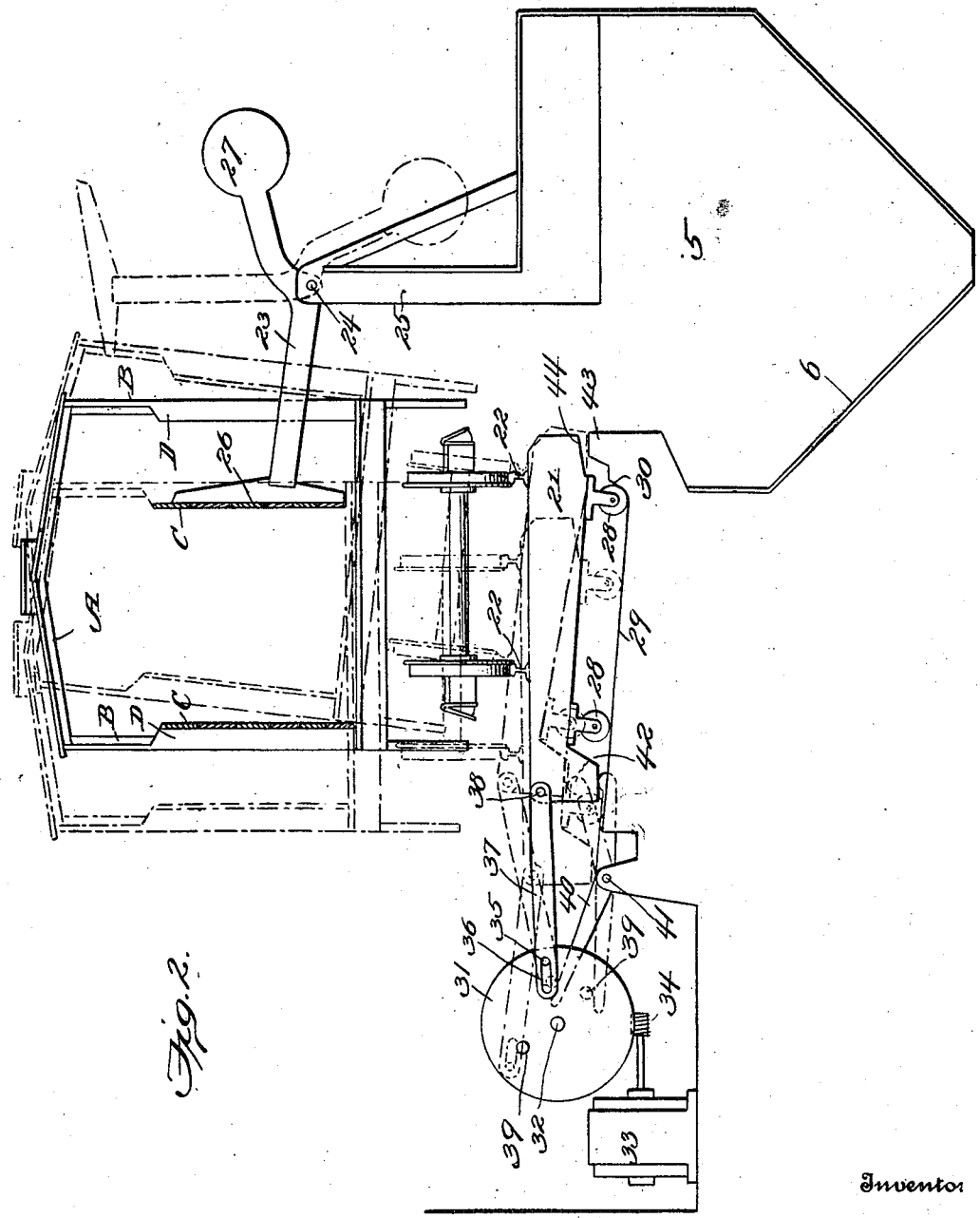
Inventor
Henry Richardson
By
Attorney Patented May 29, 1923.

1,457,186

UNITED STATES PATENT OFFICE.

HENRY RICHARDSON, OF PASSAIC, NEW JERSEY.

CAR UNLOADER.

Application filed December 2, 1920. Serial No. 427,793.

*To all whom it may concern:*

Be it known that I, HENRY RICHARDSON, a subject of the King of Great Britain, residing at Passaic, in the county of Passaic and State of New Jersey, United States of America, have invented certain new and useful Improvements in Car Unloaders, of which the following is a specification.

My present invention relates to improvements in car unloaders and more especially to those of the kind adapted to unload railway box cars containing grain or similar material, by forcing open the door or closure across the door opening in the side of the car to permit the grain or other material to flow or to be otherwise discharged from the car.

The primary object of the invention is to provide a novel and improved means for pushing open the door or other closure which retains the grain within the car. In transporting grain and similar materials in bulk over railways, it is customary to load the grain into ordinary box cars after the door openings in the sides of the car have been closed, usually by boards which are placed horizontally across the respective door openings, one board being placed edgewise on top of the other to a suitable height, and the boards being secured in place by nailing them against the uprights at the opposite sides of the door opening. When the grain has been loaded into the car, it presses against the inner sides of these boards which form the door or closure, and ordinarily it requires considerable time to remove these boards preparatory to or during the unloading of the car. The present invention provides means whereby the car door or closure is pushed in or open expeditiously and effectively incidental to a movement or displacement of the car in a direction laterally of its length, such movement or displacement of the car, aided by the weight and momentum of the load therein, serving effectively to loosen and push the door or closure inwardly against the pressure of the grain or other contents, thus providing an opening through which the grain or contents may be discharged.

It is to be understood that the invention is applicable to a car unloader, wherein the car is simply moved or displaced laterally to effect opening of the door or closure thereof, preparatory to the unloading of the car by the use of the usual shoveling apparatus, such as that employed in connection with grain elevators, or by any other mode of unloading, and also to an unloader wherein the car is tilted to partially or completely effect the unloading of the car by the consequent flow of the grain or other material.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 represents an end elevation, partly in section, of a car unloader and a door opener constructed in accordance with the present invention; and Figure 2 is a view similar to Figure 1, showing another embodiment of the invention.

The present invention is applicable to car unloaders of various kinds, wherein the door of the car is pushed in, in consequence of a movement or displacement of the loaded car in a direction laterally or transversely of its length, the weight or momentum of the loaded car effecting or aiding materially in loosening the door or closure and pushing it inwardly against the pressure of the grain or contents of the car. Two embodiments of the invention are shown in the accompanying drawings and will be hereinafter described in detail, but it is to be understood, however, that the invention is not restricted to the particular construction shown, as equivalent constructions are contemplated and these will be included within the scope of the claims.

In the embodiment of the invention shown in Figure 1, 1 designates a platform or bridge which is provided with rails 2 to receive the car A, which is to be unloaded, it being understood that the rails on the platform or bridge are to be brought into alinement with adjacent stationary rails to enable the cars to be placed upon the platform or bridge for unloading and to be subsequently removed therefrom. The platform or bridge 1 is movable or shiftable in a direction transverse to the lengths of the car-supporting rails thereon, and furthermore, the platform or bridge during this transverse movement follows a path which is inclined in a direction transversely of the platform or bridge, so that during the lateral movement of the bridge or platform, the car thereon will be displaced in a direction transverse to its length and it will rise or descend, according to the direction of movement of the bridge or platform, the car, however, remaining in upright position. For this purpose, the platform or bridge 1 is mounted on wheels or rollers 3 which travel on a suitable number of rails 4 which extend transversely with respect to the length of the platform or bridge and are inclined in a direction transversely of the platform or bridge. A pit 5 may be provided adjacent to or immediately beyond the lower ends of the inclined rails 4 and a hopper 6 may be located in this pit to receive the grain or other material discharged from the car, the hopper serving to conduct the grain or other unloaded material to suitable elevating or conveyer mechanism. The transverse movements of the car-carrying platform or bridge may be effected or controlled in different ways. Fluid pressure mechanism is provided for this purpose in the present instance, it comprising a piston 7 which is operatively connected to the car-carrying platform, and a cylinder 8 in which the piston reciprocates, the cylinder being pivotally connected at 9 to a fixed abutment 10 and provided with conduits 11 and 12 which lead into its opposite ends and serve to admit or discharge fluid under control of suitable valves, and thus cause reciprocation of the piston which, in consequence, causes corresponding transverse movements of the car-carrying platform. If desired, counterbalancing means may be provided to oppose, to the desired degree, the tendency of the platform and the car thereon to descend along the transverse inclined rails. A conventional counter-weight 13 is shown for this purpose in the present instance, it being attached to the car-carrying platform by a cable or chain 14 which passes over a pulley 15 located at one side of the platform.

When, as is customary, railway box cars are employed for the shipping of grain or similar materials in bulk, the door openings B at opposite sides of the car are closed or covered to a suitable height above the floor of the car by boards C, which are placed one upon the other and are nailed against uprights D at the opposite sides of the door openings. Unloading of the car requires removal of these boards which constitute the door or closure at one side of the car, this being necessary whether the unloading be accomplished by the natural flow of the grain or material, or by the aid of shoveling apparatus, such as that commonly used in grain elevators. The door opener, as shown in Figure 1, comprises a rigid beam or member 16 which is pivoted at 17 on a rigid stationary standard or upright 18, so that the beam or member 16 may swing in a vertical plane, one end of the beam or member 16 being provided with a head 19 of a suitable width to correspond with the number of boards which it is desired to remove or open, and the opposite end of the member 16 is preferably provided with a counterweight 20 which overbalances somewhat the opposite end of the member 16, and hence normally tends to hold the member 16 in a substantially upright position with the head 19 elevated and clear of a car on the platform, as shown by the dotted lines in Figure 1. It will be understood that by this arrangement, the door opener is mounted on a rigid stationary support at one side of a car positioned on the platform and that the laterally movable platform enables the car to be moved laterally in a direction toward and from the door opener.

In installing and using car unloading mechanism of the construction hereinbefore described, it is preferable to so arrange the car-supporting platform or bridge 1 so that the rails 2 thereon will be alined with the adjacent stationary rails, over which the car is conveyed to and from the platform, when the platform is in its upper position, as shown by the full lines in Figure 1, the car and the platform being then retracted relatively to the door opener. While the platform is in this position, the car to be unloaded is shifted endwise onto the platform, the door opener at this time being in its elevated or inoperative position, as shown by the dotted lines in Figure 1, so that it will clear the car. The counterweight 13 may be advantageously proportioned so that it will serve to retain the platform in a position with its rails in alinement with the adjacent stationary rails when the platform is unloaded or without a car, and a suitable stop or lock may be provided for retaining the platform in this position until the time arrives for shifting it. While the car and platform occupy the initial or full line position shown in Figure 1, the door opener is brought into operative position by lowering the head 19 thereof to bring it against the outer side of the door or closure formed by the boards. While the door opener occupies this position, the platform and the car thereon are caused to shift toward the right in Figure 1 or toward the support for the door opener, until the platform and car reach substantially the position indicated by the dotted lines in Figure 1. This lateral displacement of the car and platform involves a descending movement of these elements, owing to the downward inclination of the rails on which the car-supporting platform is mounted, the platform operating on the principle of the inclined plane and the weight of the loaded car supplying force which acts to cause descent and concurrent lateral movement of the car and platform.

As the door opener is supported against lateral displacement by this stationary support 17, the lateral displacement of the car, while the door opener is in operative position, will cause detachment of the boards composing the door or closure from the side of the car, and as the car continues to shift laterally, the side thereof from which the door or closure was detached will become separated from the door or closure to an extent that will provide openings or spaces between the ends of the door or closure and the adjacent side of the car, which will be of sufficient width to permit the flow of the grain or other material from the interior of the car, and downwardly through the opened door thereof, this material being received in the hopper 6 located in the pit 5. This lateral displacement of the car, which serves to open the door or closure thereof, is effected either wholly or partially by the weight of the grain or load in the car, the lateral movement of the car being controlled by the fluid pressure piston and cylinder 7 and 8. In the particular form of unloader shown in Figure 1, a considerable portion of the load of grain or other material, will discharge from the car by the natural flow of the grain or material and the unloading of the car may be completed in any suitable way, as, for example, by the use of a shoveling apparatus, such as that with which grain elevators are usually equipped. After the car has been completely unloaded, it is returned from the dotted line position to the full line position (Figure 1) by the fluid pressure mechanism, the car rails on the platform being then restored to alinement with the adjacent stationary car rails, so that the unloaded car may be removed and another loaded car brought into position on the platform.

In the embodiment of the invention shown in Figure 2, the opening of the door or closure of the car, preparatory to the unloading thereof, is effected by a lateral movement or displacement of the car under the influence of the load in the car, it conforming in this respect substantialy with the unloading apparatus shown in Figure 1, but in additional to the lateral displacement of the car, which occurs incidental to the opening of the door or closure thereof, the car is tilted laterally to facilitate the flow of the grain or material therefrom. In this embodiment of the invention, 21 designates the car-carrying platform or bridge, which corresponds substantially with the bridge in the preceding instance, it having rails 22 thereon to receive the loaded car which may be of the same type as that shown and described above. The door opener shown in Figure 2 also corresponds substantially to that shown in Figure 1, it comprising a beam or arm 23 which is pivoted at 24 to a stationary rigid standard or support 25, one end of the beam or arm 23 being provided with a head 26 of a suitable width to engage the lower portion of the door or the door throughout its height, as may be desired, and the beam or arm is provided at its opposite end with a counter-weight 27 which serves to retain the door opener in its elevated or inoperative position, as shown by the dotted lines in Figure 2.

The car-carrying platform 21 is mounted to shift laterally in relation to its length and to travel in an inclined path during its lateral movements, it being shown, for example, in the present instance as mounted on rollers 28 which travel on a laterally inclined surface or track 29, and a suitable stop is provided for limiting the downward and lateral movement of the platform in one direction, the stop 30 shown in the present instance in the form of a shoulder, cooperating with the lower supporting rollers 28 for this purpose. Preferably, the platform occupies its lowermost position when the car rails 22, thereon are in alinement with the adjacent stationary rails over which the car travels while being shifted to and from the platform, the stop also serving to limit the lateral and downward movement of the car during the door opening operation. Suitable means is provided for displacing or moving the car laterally or in a direction away from the door opener, in order to enable the door opener to be brought into operative position, after which the car is shifted laterally in a reverse direction to effect the door opening operation. Different mechanisms may be employed for effecting these movements of the car platform and the car thereon. For example, a revoluble member 31 mounted on a fixed axis 32 and driven by an electric motor 33 or other suitable source of power, through a worm 34 or other appropriate motion-transmitting means, may be provided at one side of the car platform, the member 31 being provided with a crank pin 35 which operates in a slot 36 in one end of a link 37, the opposite end of this link being pivotally connected at 38 to the adjacent side of the platform. By such an arrangement, when the platform is in its initial or normal position, as shown by the full lines in Figure 2, the crank pin 35 and link 37 will occupy the full line positions shown in that figure. Shifting of the platform and car upwardly and to the left toward the dotted line position shown in Figure 2, is effected by rotation of the member 31 in an anti-clockwise direction, whereby the crank pin 35 acts on the link 37 to draw the platform to the left. While the platform and car are held in the extreme lefthand position shown by dotted lines, by the member 31, the door opener is swung downwardly into operative position, so that the head 26 thereon is brought into a position at the outer side of the door or closure of the car. While the door opener occupies this position, the direction of rotation of the member 31 is reversed, the crank pin 35 thereon being then shifted in a clockwise direction which permits the weight of the car and the load therein to effect lateral and downward displacement of the car and platform in a direction toward the right in Figure 2, and during this movement of the car, the side of the car adjacent to the door opener is shifted toward the door opener, while the door or closure is held from movement laterally by the head 26 of the door opener, in consequence of which the boards or a portion thereof constituting the door or closure, are detached from the side of the car and as the car continues its lateral movement or displacement, openings or spaces are formed between the ends of the door or closure and the adjacent side of the car, these openings or spaces being of sufficient width to permit the grain or other material in the car to flow therethrough and to discharge through the door openings. This lateral and downward movement of the platform and car continues until the platform reaches its limiting stop. In this embodiment of the invention, the car is subsequently tilted to facilitate the flow of the grain or other material toward the opened door. Different means may be provided for accomplishing this result. For example, in the present instance, the rotatable member 31 is provided with a pin 39, which, during the clockwise rotation of the member 31, after the platform has reached its limiting stop, engages one arm of a lever 40, the latter being mounted on a fixed pivot 41 and provided with a heel 42 which is arranged to bear against the underside of the platform 21 and to lift this side of the platform upwardly to tilt the platform and the car thereon into substantially the angular position shown by the dotted lines in Figure 2, the floor of the car then sloping toward the opened door so that the grain or the greater portion thereof will flow naturally toward and out through the opened door. In those cases, where the inclination or lateral tilt of the car is not sufficient to cause complete discharge of all of the grain or other material, by the natural flow thereof, shoveling apparatus or other suitable means may be employed to complete the unloading of the car. In order to sustain the weight of the platform and the loaded car thereon, when tilted, a fulcrum 43 may be provided beyond the limiting stop 30 on which a part 44 of the platform may rest. When the unloading of the car has been completed, the member 31 is rotated in an anti-clockwise direction, this causing the pin 39 to recede from the lever 40, thus permitting the platform and the car to return to their normal upright position, and the continued rotation of the member 31 will cause the pin 35 to act on the link 37 to draw the platform and car toward the left, until the car reaches substantially the extreme lefthand position indicated by the dotted lines in Figure 2. The door opener may then be swung into its upright or inoperative position, after which the member 31 may be rotated in a clockwise direction until it reaches the full line position shown, the platform being then against its stop with the car in an upright position and the rails on the platform in alinement with the adjacent stationary rails, so that the unloaded car may be removed from the platform and another loaded car brought into position thereon.

In both instances herein shown and described, the weight of the grain or other load in the car acts to move or displace the car laterally and toward the door pusher and to supply the necessary force or the substantial part of the force necessary to open or push in the door of the car. Furthermore, in both instances the car is bodily displaced laterally to effect the door-opening operation, the car remaining in an upright position during this operation. By thus displacing the car bodily in a direction laterally of its length, the door or closure in the side of the car is opened to a maximum extent for a given extent of displacement or movement of the car, and furthermore, the car can be handled or controlled easily as its center of weight is not shifted. While the car is displaced laterally in a substantially rectilinear direction relatively to the door opener, it will be understood that the door, during its opening movement may and probably will drift upwardly or away from the floor of the car, due to the greater pressure of the grain or other material at the lower portion of the door, as compared to that at its upper portion, but such upward drift of the door would be advantageous as it would provide an additional opening beneath the door for the discharge of the grain or other material. Where the car is tilted laterally subsequently to the door-opening operation, the unloading operation is facilitated by the increased natural flow of the grain or other contents. By arranging the car-carrying platform so that the car rails thereon will be in line with the adjacent stationary rails while the car is in unloading position, danger of damaging the car, should it be bumped by another car accidentally passing onto the platform from the adjacent rails, will be avoided or minimized.

I claim as my invention:—

1. In a car unloader, in combination, a car-door opener, and means for supporting a car to move bodily in a direction laterally of its length toward the door opener while the latter is in engagement with the door.

2. In a car unloader, in combination, a car-door opener, and means for supporting a car to move laterally while maintained in upright position and toward the door opener while the latter is in cooperative relation with the car door.

3. In a car unloader, in combination, a car-door opener, and means for supporting a car to move substantially rectilinearly in a direction transversely of its length and toward the door opener while the latter is in cooperative relation with the car door.

4. In a car unloader, in combination, a door-opener adapted to engage the outer side of a door in a side of a grain car, and means for displacing a car bodily in a direction transversely of its length and toward the door-opener while the latter is in cooperative relation with the car door.

5. In a car unloader, in combination, a platform for supporting a car to move bodily in a direction laterally and downwardly under the influence of the weight of the load therein, and a door opener toward which one side of the car is moved and operative as an obstruction to the door in said side of the car to effect opening thereof.

6. In a car unloader, in combination, a platform for supporting a car to move laterally a laterally-inclined track on which said platform travels, and a door opener movable in a direction transversely of the direction of movement of the car to bring it into a position to engage the outer side of a door in the side of the car and operative to open said door during the lateral movement of the car.

7. In a car unloader, in combination, a platform for supporting a car to move laterally, and a door opener mounted to swing into an inoperative position clear of the car and also adapted to swing into a position to engage the outer side of a door in the side of the car, the door opener when in the latter position operating to open such door by a lateral movement of the car.

8. In a car unloader, in combination, a platform for supporting a car for lateral displacement, and a door opener pivoted to swing in a plane transverse to the length of the car, the door opener when in one position being clear of a car on said platform and when in another position occupyig a position opposite to the outer side of a door in the side of the car, the car when displaced laterally causing opening of such door.

9. In a car unloader, in combination, a platform for supporting a car for lateral displacement, and a device for opening a door in a side of such car comprising an arm pivoted to one side of the car to swing vertically, said arm when in its upper position being clear of a car on said platform and when in its lower position being opposite to a door in the adjacent side of the car, the door opener being operative to hold the door from lateral movement during the lateral movement of the car and to thus cause opening of the door relatively to the car.

10. In a car unloader, in combination, means for supporting a car on an inclined plane to move laterally of its length, and a door opener operative to hold a door in the side of the car from lateral movement during the lateral movement of the car and to thus cause opening of the door.

11. In a car unloader, in combination, means for maintaining a car for lateral and downward displacement in an inclined direction under the influence of the weight of a load therein, and a door opener operative to hold a door in the side of the car from lateral displacement during the lateral displacement of the car.

12. In a car unloader, in combination, means for maintaining a car for lateral displacement, a door opener operative to hold a door in the side of the car from lateral displacement during lateral displacement of the car and to thus open such door, and means for tilting the car laterally to induce a flow of the contents of the car toward such opened door.

13. In a car unloader, in combination, means for maintaining a car for bodily displacement in a direction laterally of its length, a device operative in consequence of such lateral displacement of the car to cause opening of a door in the side thereof, and means for subsequently tilting the car laterally to induce a flow of its contents toward said opened door.

14. In a car unloader, in combination, a platform for supporting a car for displacement in a direction laterally of its length, a device operative in consequence of such lateral displacement of the car to cause opening of a door in the side thereof, and means for tilting said platform and the car thereon laterally to induce a flow of the contents of the car toward the opened door thereof.

In testimony whereof I have hereunto set my hand in presence of two subscribing witnesses.

HENRY RICHARDSON.

Witnesses:
E. F. WHITE,
EDWARD BREWER.